United States Patent Office 2,769,005
Patented Oct. 30, 1956

2,769,005

PROCESS FOR THE PREPARATION OF MELAMINE

Henry A. Walter, Longmeadow, Mass., assignor to Monsanto Chemical Company, St. Louis, Mo., a corporation of Delaware No Drawing. Application January 12, 1952,
Serial No. 266,235

7 Claims. (Cl. 260—249.7)

This invention relates to a process of preparing melamine. More particularly the invention relates to an improvement in the process for preparing melamine from urea.

One method for preparing melamine is to heat urea under pressure in the presence of anhydrous ammonia. The process has several advantages over other methods for the preparation of melamine but the yields are generally in the neighborhood of less than 60% of theoretical and the product is contaminated with by-products such as ammonium carbamide, biuret, cyanuric acid, etc. The refining of the products of the reaction to obtain pure melamine is time consuming and costly.

One object of this invention is to provide an improved process for the preparation of melamine from urea.

Another object is to provide a process for the preparation of melamine from urea in relatively high yields.

A further object is to minimize the production of unwanted by-products in the process for the preparation of melamine from urea.

These and other objects are attained by heating urea in a stream of anyhdrous ammonia first at 130–150° C. and then at 200–300° C.

The following examples are given in illustration and are not intended as limitations on the scope of this invention. Where parts are mentioned they are parts by weight.

Example I

Place 100 parts of urea in a pressure-resistant tubular vessel. Pass anhydrous ammonia preheated to 140° C. through the vessel. The first ammonia leaving the vessel contains moisture, apparently from the decomposition of the urea. When the ammonia leaving the reaction vessel contains no more water, raise the temperature of the ammonia entering the reaction vessel to 280° C. Continue passing hot anhydrous ammonia through the vessel until substantially all the urea is transformed into melamine. The melamine sublimes as it is formed and is carried out of the reaction vessel by the stream of hot anhydrous ammonia. Conduct the melamine-containing stream against a cold surface to condense the melamine. From 70 to 100 mols of ammonia are necessary to transform 1 mol of urea to melamine. The ammonia can be recovered, dried and used over again.

In the first stage of the process, the temperature must be carefully controlled between 130–150° C. and for best results should be restricted to 135–140° C. The urea decomposes at this temperature yielding water which must be eliminated as soon as it is formed. This is advantageously accomplished by rapidly passing a stream of anhydrous ammonia over the urea.

In the second stage, the temperature should be between 200–300° C. and preferably between 220–280° C. In this temperature range, melamine is formed and must be removed from the reaction zone substantially immediately. Since the melamine sublimes at temperatures above 220° C., it may be easily and quickly removed by blowing anhydrous ammonia across the reaction zone. The melamine may be recovered by cooling the ammonia stream or by conducting the stream against a cool surface to condense the melamine.

Although the temperatures of the process may be regulated by external heating of the reaction vessel, they are best regulated by preheating the anhydrous ammonia to the desired temperature and then passing the hot ammonia over the urea at such a rate that the temperature drop is not substantial.

The process of this invention may be carried out at atmospheric pressure. However, it is possible to use either reduced or increased pressure, if desired, in either or both steps. For example, the first temperature stage may be carried out at pressures below atmospheric and the second stage at pressures up to 2500 p. s. i. g.

The ammonia used in the process may be dried and recirculated through the system. Under some conditions, it may be desirable to dilute the ammonia with up to 20% by volume of an anhydrous inert gas such as nitrogen.

The process may be made continuous by passing urea on a continuous belt through a first reaction zone in which the ammonia moves in a counter current direction and then passing the reaction product into a second reaction zone in which the ammonia moves in a concurrent direction, i. e., in the same direction as the reaction product. The rate of travel of the concurrent stream of ammonia must be substantially greater than the rate of travel of the reaction product to enable the removal of the melamine from the second reaction zone substantially as soon as it is formed.

The process of this invention makes it possible to prepare melamine from urea in substantially 100% yields and without producing such by-products as deaminated triazines, biuret, cyanuric acid, etc. The process may be carried out without the expensive high pressure reaction vessels normally used for preparing melamine and the process may be made continuous.

It is obvious that variations may be made in the process of this invention without departing from the spirit and scope thereof as defined by the appended claims.

What is claimed is:

1. A process for preparing melamine which comprises heating urea at 130–150° C. in a continuous stream of anhydrous ammonia whereby water formed as a by-product is removed from the reaction zone substantially as soon as it is formed and thereafter heating the product at 200–300° C. in a continuous stream of anhydrous ammonia whereby the melamine formed is removed from the reaction zone as soon as it is formed.

2. A process as in claim 1 whereby the heat required for the reaction is supplied by preheating the anhydrous ammonia.

3. A process as in claim 1 whereby the temperature of the initial reaction is maintained at 135–140° C. until all the water is removed.

4. A process as in claim 1 wherein from 70 to 100 mols of anhydrous ammonia are used for each mol of urea.

5. A process as in claim 1 wherein the ammonia is diluted with up to 20% by volume of an inert gas.

6. A process as in claim 1 wherein the temperature in the second step is limited to 220–280° C.

7. A continuous process for preparing melamine which comprises passing urea through a first reaction zone maintained at 130–150° C. while continuously passing a countercurrent stream of anhydrous ammonia over the urea and then passing the reaction product through a second reaction zone maintained at 200–300° C. while continuously passing a concurrent stream of anhydrous ammonia over the reaction product, said concurrent stream of ammonia traveling at a rate substantially greater than the rate at which the said reaction product travels through the second reaction zone, whereby the melamine formed is removed substantially immediately from said second reaction zone.

References Cited in the file of this patent

UNITED STATES PATENTS

| | | |
|---|---|---|
| 2,527,315 | Mackay | Oct. 24, 1950 |
| 2,566,231 | Paden | Aug. 28, 1951 |

FOREIGN PATENTS

| | | |
|---|---|---|
| 583,504 | Great Britain | 1946 |
| 628,255 | Great Britain | 1949 |